US008510713B1

(12) United States Patent
Ormandy

(10) Patent No.: US 8,510,713 B1
(45) Date of Patent: Aug. 13, 2013

(54) METHOD AND SYSTEM FOR VALIDATING A DISASSEMBLER

(75) Inventor: Tavis Ormandy, Zurich (CH)

(73) Assignee: Google Inc., Mountain View, CA (US)

( * ) Notice: Subject to any disclaimer, the term of this patent is extended or adjusted under 35 U.S.C. 154(b) by 1143 days.

(21) Appl. No.: 12/262,524

(22) Filed: Oct. 31, 2008

(51) Int. Cl.
*G06F 11/36* (2006.01)

(52) U.S. Cl.
USPC ........... 717/124; 717/100; 717/174; 717/175; 717/176; 717/177; 714/38

(58) Field of Classification Search
USPC .................... 717/100, 124, 174–177; 714/38
See application file for complete search history.

(56) References Cited

U.S. PATENT DOCUMENTS

| | | | |
|---|---|---|---|
| 5,974,549 | A | 10/1999 | Golan |
| 6,128,774 | A | 10/2000 | Necula et al. |
| 6,275,938 | B1 | 8/2001 | Bond et al. |
| 6,499,123 | B1 * | 12/2002 | McFarland et al. ........... 714/724 |
| 7,188,282 | B2 | 3/2007 | Walmsley |
| 7,581,103 | B2 | 8/2009 | Home et al. |
| 2004/0123117 | A1 | 6/2004 | Berger |
| 2005/0283770 | A1 | 12/2005 | Karp et al. |
| 2006/0174077 | A1 | 8/2006 | Abadi et al. |
| 2006/0259878 | A1 * | 11/2006 | Killian et al. ...................... 716/1 |
| 2007/0107057 | A1 | 5/2007 | Chander et al. |
| 2007/0261124 | A1 | 11/2007 | Centonze et al. |
| 2009/0007223 | A1 | 1/2009 | Centonze et al. |
| 2009/0282477 | A1 | 11/2009 | Chen et al. |
| 2009/0327937 | A1 * | 12/2009 | Lachner ......................... 715/764 |

OTHER PUBLICATIONS

Apap, F., et al., "Detecting Malicious Software by Monitoring Anomalous Windows Registry Access", Recent Advances in Intrusion Detection, 2002; 18 pages.

Erlingsson, Ú., et al., "XFI: Software Guards for System Address Spaces", OSDI '06; 7th USENIX Symposium on Operating Systems Design and Implementation, Nov. 2006; pp. 75-88.
Ford, B., "VXA: A Virtual Architecture for Durable Compressed Archives", FAST '05: 4th USENIX Conference on File and Storage Technologies, Dec. 2005; pp. 295-308.
McCamant, S., et al, "Evaluating SFI for a CISC Architecture", Security '06: 15th USENIX Security Symposium, Aug. 2006; pp. 209-224.
Necula, G., "Proof Carrying Code", Proceedings of the 24th Annual ACM SIGNPLAN-SIGACT Symposium on Principles of Programming Languages, Jan. 1997; 14 pages. Prasad, W., et al., "Locating System Problems Using Dynamic Instrumentation", Proceedings of the Linux Symposium, vol. 2, Jul. 2005; pp. 49-64.
Wahbe, R., et al., "Efficient Software-Based Fault Isolation", ACM SIGOPS '93 Operating Systems Review, vol. 27, No. 5, Dec. 1993; pp. 203-216.
Webber, M., et al., "A Toolkit for Detecting and Analyzing Malicious Software", Proceedings of the 18th Annual Computer Security Applications Conference, Dec. 2002; pp. 423-431.

* cited by examiner

*Primary Examiner* — Chat Do
*Assistant Examiner* — Lynda Dinh
(74) *Attorney, Agent, or Firm* — Honigman Miller Schwartz and Cohn LLP

(57) ABSTRACT

Some embodiments provide a system that analyzes the operation of a disassembler. The system starts by generating a set of processor instructions. Next, the system validates the disassembler using each processor instruction from the set of processor instructions by obtaining an assembly representation for the processor instruction using the disassembler. The system then monitors an execution of the processor instruction on a processor operating in single-step mode to produce an execution result for the processor instruction, and determines a correctness of the disassembler by comparing the assembly representation for the processor instruction with the execution result for the processor instruction.

21 Claims, 3 Drawing Sheets

METHOD AND SYSTEM FOR VALIDATING A DISASSEMBLER

BACKGROUND

1. Field

The present embodiments relate to techniques for evaluating a disassembler. More specifically, the present embodiments relate to a method and system for validating the operation of a disassembler.

2. Related Art

A disassembler is typically used to translate an executable program into an equivalent assembly representation. In other words, the disassembler translates machine code from the executable program into human-readable assembly code. The assembly representation may then be used to analyze the program's structure and execution. For example, assembly code from the disasembler may be used to debug the program, validate the program's compliance with a security policy, and/or reverse engineer the functionality of the program.

Disassembler design is often based on documentation associated with a processor and/or instruction set architecture (ISA). For example, an x86 disassembler may operate using a table that includes mappings between x86 operation codes (opcodes) and assembly code. Such mappings may be based on documentation provided by x86 processor vendors. As a result, x86 executables may be disassembled by reading machine code from the x86 executables and looking up the corresponding assembly instructions from the table.

However, documentation for very long instruction word (VLIW) and/or variable length ISAs (e.g., x86) may frequently be inaccurate and/or incomplete. Hence, disassemblers built using such documentation may produce inaccurate or inconsistent results. Furthermore, security tests of executable programs that use these disassemblers may be unreliable. For example, an x86 disassembler may be unable to reveal the use of certain system calls, illegal memory accesses, branch targets, and/or other security-related issues within an x86 executable program.

Hence, it is advantageous to provide mechanisms for verifying the correctness of disassemblers.

SUMMARY

Some embodiments provide a system that analyzes the operation of a disassembler. The system starts by generating a set of processor instructions. Next, the system validates the disassembler using each of the processor instructions by:
 (i) obtaining an assembly representation for the processor instruction using the disassembler;
 (ii) monitoring an execution of the processor instruction on a processor operating in single-step mode to produce an execution result for the processor instruction; and
 (iii) determining the correctness of the disassembler by comparing the assembly representation for the processor instruction with the execution result for the processor instruction.

In some embodiments, comparing the assembly representation with the execution result involves at least one of:
 (i) verifying an instruction length of the processor instruction;
 (ii) verifying a branch target of the processor instruction; and
 (iii) verifying memory access associated with the processor instruction.

In some embodiments, the memory access is associated with segmented memory.

In some embodiments, determining the correctness of the disassembler involves generating an error based on an inconsistency between the assembly representation and the execution result.

In some embodiments, the processor instruction corresponds to a very long instruction word (VLIW) instruction.

In some embodiments, the set of processor instructions corresponds to an enumerated set of possible processor instructions for the processor.

In some embodiments, the set of processor instructions is generated randomly.

In some embodiments, the disassembler is used to validate a native code module.

DETAILED DESCRIPTION

Figure 1:
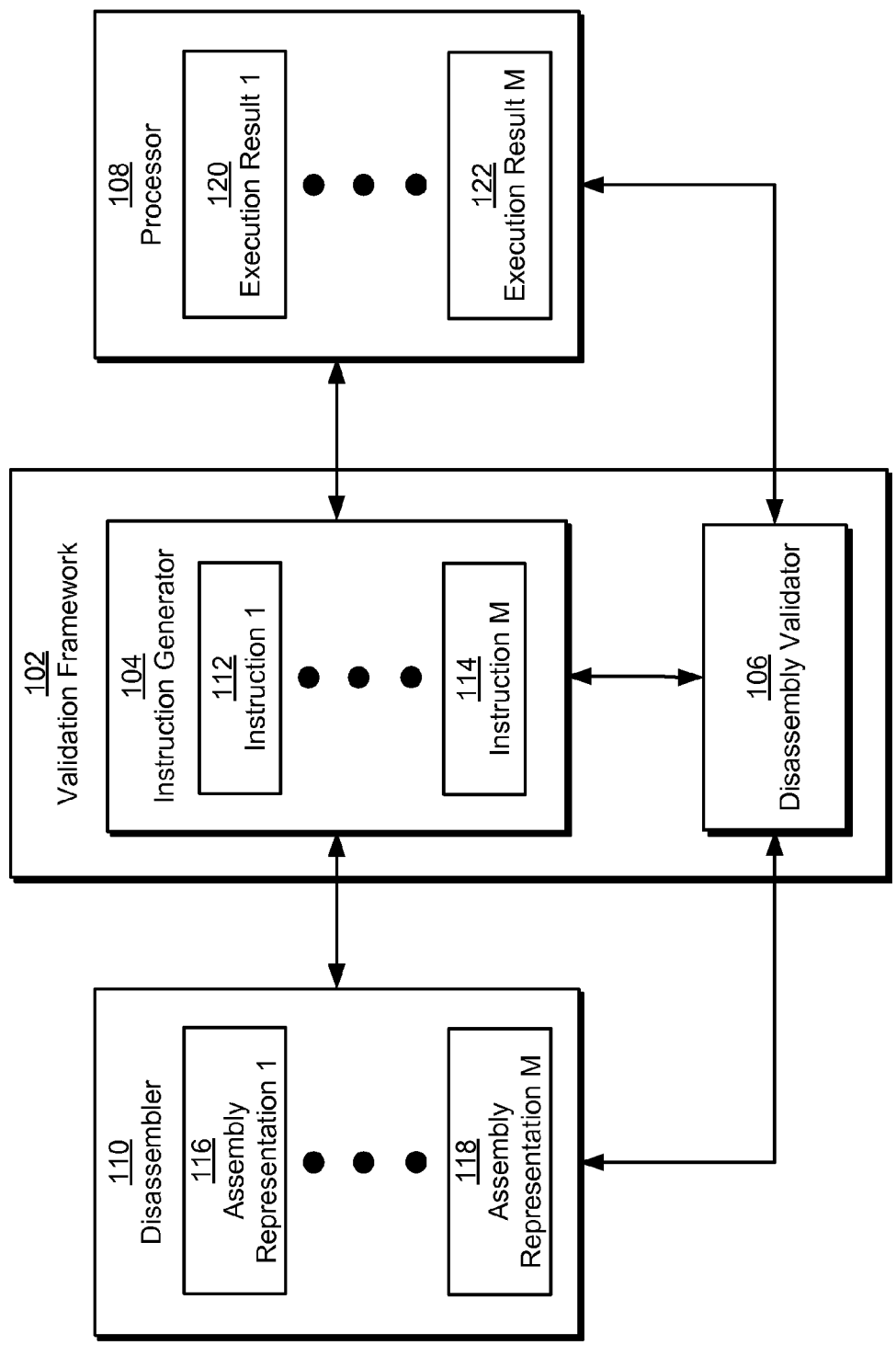
FIG. 1 shows a schematic of an embodiment of a system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for analyzing a disassembler. The disassembler may be used to disassemble very long instruction word (VLIW) instructions from executable programs. For example, the disassembler may correspond to an x86 disassembler. The disassembler may additionally be used in security testing of the executable programs. For example, the disassembler may be used to validate untrusted native code modules prior to executing the native code modules.

More specifically, embodiments provide a method and system for validating the disassembler. To validate the disassembler, a set of processor instructions is generated. Each processor instruction is then disassembled by the disassembler to obtain an assembly representation of the processor instruction. In addition, an execution result for the processor instruction is obtained by monitoring the execution of the processor instruction on a processor. The correctness of the disassembler is then determined by comparing the assembly representation for the processor instruction with the execution result for the processor instruction. An error is generated if an inconsistency is found between the assembly representation and the execution result.

FIG. 1 shows a schematic of an embodiment of a system. As shown in FIG. 1, the system includes a validation framework 102 for validating a disassembler 110. Validation framework 102 further includes an instruction generator 104 and a disassembly validator 106. Each of these components is described in further detail below.

Disassembler 110 may be used to translate an executable program into an assembly representation (e.g., assembly representation 1 116, assembly representation m 118) of the executable program. More specifically, disassembler 110 may translate individual processor instructions from the executable program into assembly instructions corresponding to the processor instructions. For example, disassembler 110 may translate each processor instruction from an x86 executable into a stack instruction (e.g., push, call, pop, ret, etc.), an arithmetic logic unit (ALU) instruction (e.g., add, sub, mul, idiv), a data manipulation instruction (e.g., mov, lods, stos, movs, etc.), and/or a program flow instruction (e.g., cmp, jmp, je, jne, jb, etc.).

To perform the translation, disassembler 110 may map each processor instruction (e.g., machine code) from the executable program to an assembly instruction using a lookup table. For example, disassembler 110 may translate machine code from an x86 executable program to x86 assembly code by looking up mappings between the machine code and assembly code in a lookup table.

Those skilled in the art will appreciate that disassembler 110 may operate incorrectly, unreliably, and/or inconsistently. In particular, the operation of disassembler 110 (e.g., the lookup table) may be based on documentation associated with the instruction set architecture (ISA) of the executable program to be disassembled and/or a processor 108 on which the executable program runs. However, the documentation may be erroneous and/or incomplete. Furthermore, standard disassembly techniques may not exist for very large instruction word (VLIW) and/or variable instruction length ISAs, such as x86. Consequently, disassemblers for a particular ISA or processor (e.g., processor 108) may operate differently and/or produce assembly representations that do not accurately represent the behavior of disassembled executable programs.

The unpredictable nature of disassembly may further preclude disassembler 110 from being used in security testing of executable programs. For example, disassembler 110 may create an assembly representation of an executable program that is examined to ensure the executable program's compliance with a security policy. However, errors in disassembler 110 may keep potential security breaches such as system calls and illegal memory accesses from being detected in the executable program.

In one or more embodiments, validation framework 102 is used to analyze the correctness of disassembler 110. In other words, validation framework 102 may be used to verify the correct functioning of disassembler 110 and/or detect errors in the operation of disassembler 110. To analyze disassembler 110, instruction generator 104 may generate a set of processor instructions (e.g., instruction 1 112, instruction m 114). The processor instructions may correspond to machine code that can be disassembled by disassembler 110. The machine code may further execute on processor 108 and/or another processor associated with an ISA of the machine code. For example, the processor instructions may correspond to VLIW and/or variable instruction length instructions such as x86 operation codes (opcodes).

Moreover, instruction generator 104 may generate processor instructions in a variety of ways. In particular, instruction generator 104 may generate processor instructions randomly or as an enumerated set of possible processor instructions for processor 108. For example, instruction generator 104 may generate 50 random x86 processor instructions or enumerate the set of possible x86 processor instructions.

To validate disassembler 110 using the processor instructions, each processor instruction is disassembled by disassembler 110 to obtain an assembly representation of the processor instruction. For example, disassembler 110 may resolve the assembly instruction corresponding to the processor instruction by performing a table lookup that maps the processor instruction to the assembly instruction. As a result, disassembler 110 may disassemble each processor instruction (e.g., instruction 1 112, instruction m 114) from instruction generator 104 to produce an assembly representation (e.g., assembly representation 1 116, assembly representation m 118) for the processor instruction.

In addition, validation framework 102 may monitor the execution of the processor instruction on processor 108 to produce an execution result (e.g., execution result 1 120, execution result m 122) for the processor instruction. In one or more embodiments, the processor instruction is executed in single-step mode on processor 108 by a subordinate subprocess spawned by validation framework 102. For example, validation framework 102 may use a single-step mode on a tracing utility to execute the processor instruction, or validation framework 102 may execute the processor instructions generated by instruction generator 104 as a part of an executable program with a trap flag bit set. The execution result for the processor instruction may thus correspond to the state of processor 108 before, during, and/or after the processor instruction is executed. For example, execution result 1 120 may include register values, exceptions, and/or other attributes associated with the execution of processor instruction 1 112 on processor 108.

Next, disassembly validator 106 may determine the correctness of disassembler 110 by comparing the assembly representation of the processor instruction with the execution result for the processor instruction. For example, disassembly validator 106 may compare execution result 1 120 with assembly representation 1 116 to determine the correctness of disassembler 110 with respect to processor instruction 1 112. More specifically, disassembly validator 106 may verify one or more of the following: an instruction length of the processor instruction, a branch target of the processor instruction, and/or memory access associated with the processor instruction.

To verify the instruction length of the processor instruction (e.g., a VLIW instruction), disassembly validator 106 may obtain the program counter (e.g., instruction pointer) from the execution result of the processor instruction after processor 108 has executed the processor instruction. Disassembly validator 106 may then compare the number of bytes advanced by the program counter with the instruction length predicted by disassembler 110. Discrepancies between the two instruction lengths may correspond to bugs in disassembler 110.

The program counter may also be used by disassembly validator 106 to verify a branch target of the processor instruction. In particular, the value of a branch target buffer of processor 108 may be obtained from the execution result of a branch instruction (e.g., conditional jump instruction) after the branch instruction is executed to ensure that disassembler 110 correctly resolves the target program counter of the branch instruction. A difference between the branch target of the assembly representation and the branch target of the execution result may indicate an error in the operation of disassembler 110.

Furthermore, disassembly validator 106 may verify memory access associated with the processor instruction. For example, disassembly validator 106 may be used to verify the use of memory protection (e.g., memory segmentation, paging, etc.) by processor 108. Illegal memory accesses may be detected through hardware exceptions such as page faults and segmentation faults. Similarly, processor instructions related to memory access may be executed using anonymous and/or copy-on-write memory during the validation of disassembler 110 to enable the detection of both legal and illegal memory accesses. For example, the address space of the process executing the processor instruction may be mapped to anonymous and/or copy-on-write memory to prevent memory errors associated with reading unmapped and/or unreadable memory from occurring. At the same time, page faults associated with reads or writes to the anonymous and/or copy-on-write memory may be used to verify that disassembler 110 correctly predicts a valid memory access or detects an illegal memory access.

Those skilled in the art will appreciate that disassembly validator 106 may evaluate the correctness of disassembler 110 with respect to other attributes. For example, disassembly validator 106 may verify that disassembler 110 detects processor instructions that correspond to system calls.

If an inconsistency between the assembly representation for the processor instruction and the execution result for the processor instruction is found, disassembly validator 106 may generate an error. The error may be logged, displayed, and/or otherwise outputted to enable further analysis of the behavior of disassembler 110. As described below in the following examples, the error may include a description of the error, as well as processor 108 state information associated with the execution result.

An error associated with an illegal processor instruction may include the following output:

0x00001000: 8d e0 f1 78 a2 69 b0 77 58 9a 3a 46 4d 27 df 45
0x00001000: lea esp, eax; 2 bytes
info: Illegal Instruction detected The error includes the opcode of the processor instruction, the assembly representation of the processor instruction, and the length of the processor instruction as evaluated by disassembler 110. In other words, the error may indicate that disassembler 110 has accepted a processor instruction that is rejected by processor 108.

An error associated with instruction length may include the following output:

```
0x00001000: 0f 72 a3 5a d9 5d 51 18 9d b4 b1 3a e6 3b 3d 63
0x00001000: ; 3 bytes
error: moved 3 bytes, but nacl predicted 4
hcf.c:177,main( ):info: hint: x/i 0xffffb6e4
hcf.c:178,main( ):info: hint: x/16xb 0xffffb6e4
eax:0000000000, ebx:0x40000000, ecx:0x02000000, edx:0x00001000
esi:0000000000, edi:0x00282e00, ebp:0x20400000, esp:0x00008000
eip:0x00001000, eflags:0x00000202
cs:0x07 ds:0x0f ss:0x0f es:0x0f fs:0x0f gs:0x0f
[ c p a z s t I d o iol ioh n r v ac vif vip id ]
0x00001000: 0f 53 28 16 38 20 a8 51 55 cb c5 18 6f da be 62
0x00001000: rcpps xmm5, [eax] ; 3 bytes
eax:0000000000, ebx:0x40000000, ecx:0x02000000, edx:0x00001000
esi:0000000000, edi:0x00282e00, ebp:0x20400000, esp:0x00008000
eip:0x00001003, eflags:0x00000202
cs:0x07 ds:0x0f ss:0x0f es:0x0f fs:0x0f gs:0x0f
[ c p a z s t I d o iol ioh n r v ac vif vip id ]
```

As shown above, the error indicates that the program counter moved by three bytes, but disassembler 110 predicted an instruction length of four bytes. The error also outputs state information (e.g., register values, etc.) from processor 108 to enable debugging of the error.

An error associated with an illegal memory access may include the following output:

```
error: number of minflts increases from 31 to 32, possible ldt containment breach
hcf.c:228,main( ):info: i detected kernel 2.6.18 from uname 2.6.18.5-gg38server-xenU-3.1
eax:0x00000100, ebx:0x00080050, ecx:0000000000, edx:0x00811100
esi:0x02000000, edi:0000000000, ebp:0000000000, esp:0000000000
eip:0x00001000, eflags:0x00000202
cs:0x07 ds:0x0f ss:0x0f es:0x0f fs:0x0f gs:0x0f
[ c p a z s t I d o iol ioh n r v ac vif vip id ]
0x00001000: ae f8 cf 2a 64 81 44 76 0f 6c 1f 11 92 a1 f4 79
0x00001000: scasb al, es:[edi] ; 1 bytes
eax:0x00000100, ebx:0x00080050, ecx:0000000000, edx:0x00811100
esi:0x02000000, edi:0x00000001, ebp:0000000000, esp:0000000000
eip:0x00001001, eflags:0x00000246
cs:0x07 ds:0x0f ss:0x0f es:0x0f fs:0x0f gs:0x0f
[ c P a Z s t I d o iol ioh n r v ac vif vip id ]
```

The error suggests that a minor page fault was detected outside of the program's defined segments. The error also includes state information from processor 108 for further analysis. In other words, the error may correspond to a segmentation rule violation by the processor instruction that is not detected by disassembler 110.

The correctness of disassembler 110 may thus be evaluated in terms of errors found in the disassembly of individual processor instructions by disassembler 110. The analysis of disassembler 110 may further be conducted to enable reliable disassembly and validation of a native code module by disassembler 110. Disassembly and validation of native code modules is described in a co-pending non-provisional application by J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008, which is incorporated herein by reference.

As discussed in the above-referenced application, disassembler 110 may be used to verify a set of constraints imposed on the native code module. However, improper validation of the native code module may result in the unsafe execution of the native code module and may further compromise the security of the computer system on which the native code module executes. Consequently, disassembler 110 may be validated by validation framework 102 prior to inclusion in a native code module validator. Disassembler 110 may also be validated for the purposes of ensuring the correct functioning of reverse-engineering tools, debuggers, and/or other applications.

Figure 2:
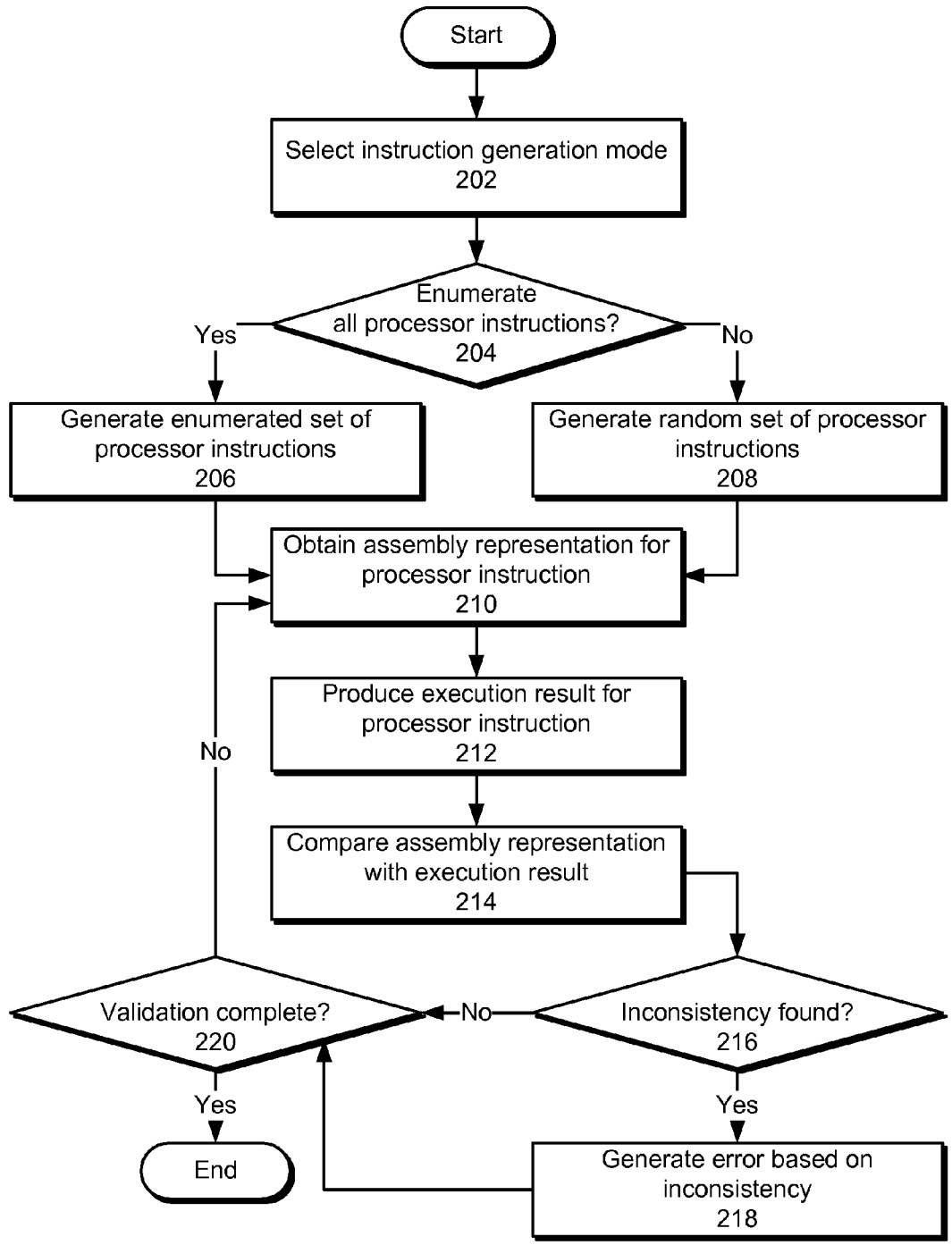
FIG. 2 shows a flowchart illustrating the process of validating a disassembler.

FIG. 2 shows a flowchart illustrating the process of validating a disassembler. In one or more embodiments, one or more of the steps may be omitted, repeated, and/or performed in a different order. Accordingly, the specific arrangement of steps shown in FIG. 2 should not be construed as limiting the scope of the technique.

Initially, an instruction generation mode is selected (operation 202). As discussed above, the instruction generation mode may enumerate all processor instructions (operation 204) or randomly generate processor instructions for a given processor and/or ISA. If the processor instructions are to be enumerated, an enumerated set of processor instructions is generated (operation 206). Otherwise, a random set of processor instructions is generated (operation 208).

Once the processor instructions are generated, the processor instructions may be used to validate the disassembler. To do so, the operation of the disassembler is evaluated for each processor instruction. More specifically, an assembly representation of the processor instruction is obtained (operation 210) from the disassembler. In other words, assembly code corresponding to the processor instruction is generated by the disassembler. Next, an execution result is produced for the processor instruction (operation 212). To produce the execution result, the execution of the processor instruction is monitored on a processor operating in single-step mode. Moreover, the processor instruction may be executed by a subordinate sub-process of a validation framework, such as validation framework 102 of FIG. 1.

To validate the disassembler, the assembly representation is compared with the execution result (operation 214). In particular, the correctness of the disassembler may be determined by verifying an instruction length of the processor instruction, verifying a branch target of the processor instruction, and/or verifying memory access (e.g., of segmented memory) associated with the processor instruction. During the comparison, an inconsistency may be found (operation 216) between the assembly representation and the execution result. For example, the assembly representation and execution result may differ in the instruction length of the instruction, a branch target of the instruction, and/or a validity of a memory access made by the instruction.

If an inconsistency is found, an error is generated based on the inconsistency (operation 218). The error may include the value (e.g., opcode) of the processor instruction, the assembly representation of the processor instruction as determined by the disassembler, and/or state information associated with the error. In addition, the error may be logged, displayed, and/or otherwise outputted to allow the disassembler to be further analyzed and/or debugged.

Validation of the disassembler may continue or terminate (operation 220) after the disassembler's correctness is evaluated with respect to the processor instruction. If validation continues, the next processor instruction is disassembled by the disassembler to obtain an assembly representation of the processor instruction (operation 210), and the processor instruction is executed on a processor to produce an execution result for the processor instruction (operation 212). The assembly representation and execution result are compared (operation 214) to determine the correctness of the disassembler, and inconsistencies between the assembly representation and execution result (operation 216) are reported as errors (operation 218). Validation of the disassembly may thus continue until the disassembler has been analyzed with respect to all processor instructions generated in operations 202-208.

Figure 3:
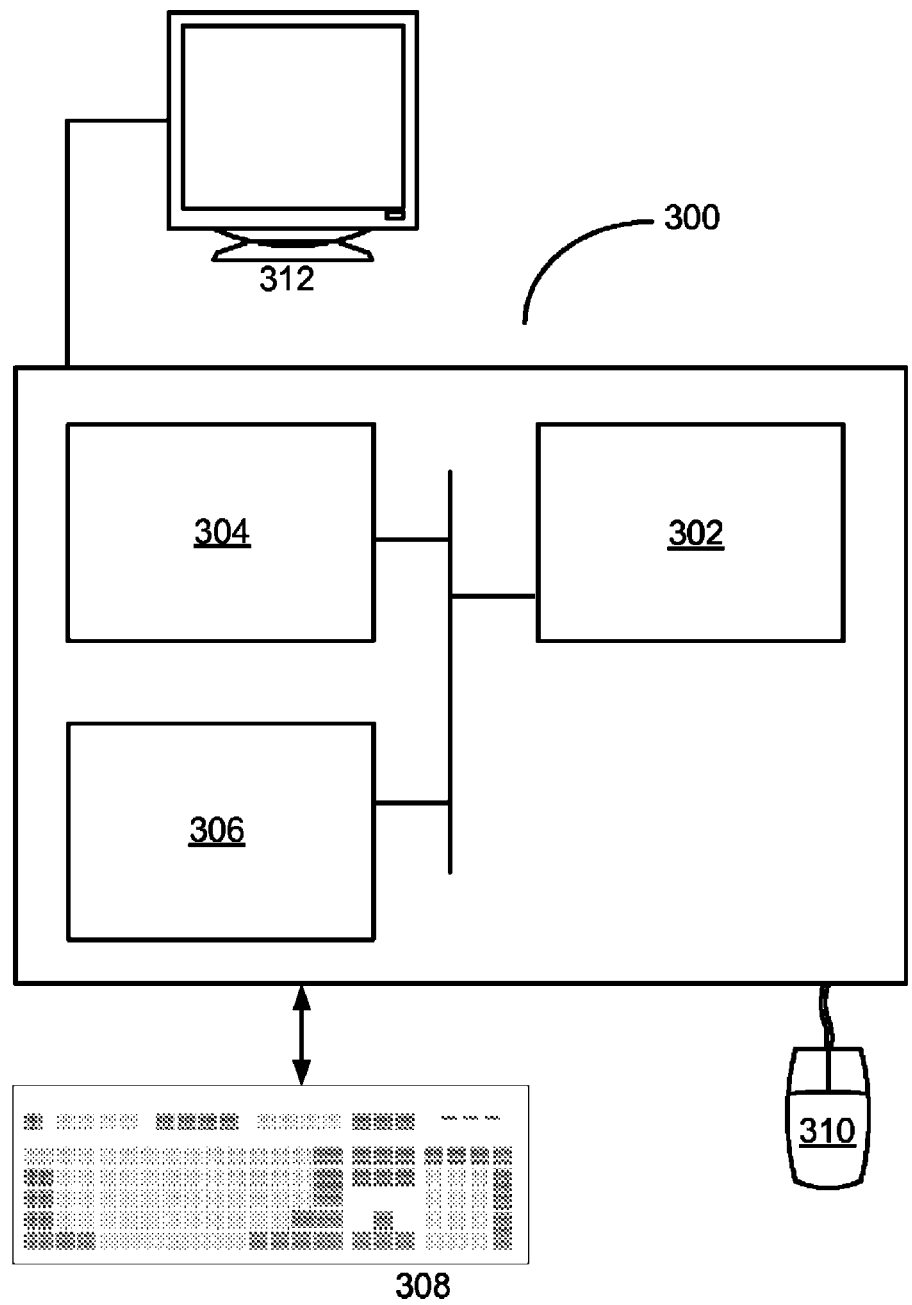
FIG. 3 shows a computer system.

FIG. 3 shows a computer system 300. Computer system 300 includes a processor 302, memory 304, storage 306, and/or other components found in electronic computing devices. Processor 302 may support parallel processing and/or multi-threaded operation with other processors in computer system 300. Computer system 300 may also include input/output (I/O) devices such as a keyboard 308, a mouse 310, and a display 312.

Computer system 300 may include functionality to execute various components of the present embodiments. In particular, computer system 300 may include an operating system (not shown) that coordinates the use of hardware and software resources on computer system 300, as well as one or more applications that perform specialized tasks for the user. To perform tasks for the user, applications may obtain the use of hardware resources on computer system 300 from the operating system, as well as interact with the user through a hardware and/or software framework provided by the operating system.

In particular, computer system 300 may execute a validation framework that analyzes the correctness of a disassembler. The validation framework may include an instruction generator that generates random processor instructions and/or enumerates all possible processor instructions for a given processor (e.g., processor 302) and/or ISA. The validation framework may also include a disassembly validator that analyzes the disassembler's operation with respect to each processor instruction by comparing the assembly representation of the processor instruction from the disassembler with the execution result for the processor instruction from the processor.

In addition, one or more components of computer system 300 may be remotely located and connected to the other components over a network. Portions of the present embodiments (e.g., processor, instruction generator, disassembly analyzer, disassembler, etc.) may also be located on different nodes of a distributed system that implements the embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the present embodiments is defined by the appended claims.

What is claimed is:

1. A computer-implemented method for analyzing a disassembler, comprising:
   generating a set of processor instructions; and
   validating the disassembler using each processor instruction from the set of processor instructions by:
   obtaining an assembly representation for the processor instruction using the disassembler;
   monitoring an execution of the processor instruction on a processor operating in single-step mode to produce an execution result for the processor instruction;
   determining a correctness of the disassembler by comparing the assembly representation for the processor instruction with the execution result for the processor instruction, the comparison comprising:

verifying an instruction length of the processor instruction by:
   receiving a program counter from the execution result after execution of the corresponding processor instruction; and
   comparing a number of bytes advanced by the program counter with an instruction length predicted by the disassembler;

verifying a branch target of the processor instruction by:
   receiving a value of a branch target from the execution result after execution of the corresponding processor instruction; and
   comparing the received branch target value with a branch target of the assembly representation for the processor instruction; and verifying memory access associated with the processor instruction by:
   using anonymous or copy-on-write memory during execution of the processor instruction; and
   receiving a hardware exception for an illegal memory access; and generating an error if an inconsistency is found between the assembly representation and the execution result, the error including a value of the processor instruction, the assembly representation of the processor instruction as determined by the disassembler, and/or state information associated with the error.

2. The computer-implemented method of claim 1, wherein the memory access is associated with segmented memory.

3. The computer-implemented method of claim 1, wherein determining the correctness of the disassembler involves:
   generating an error based on an inconsistency between the assembly representation and the execution result.

4. The computer-implemented method of claim 1, wherein the processor instruction corresponds to a very long instruction word (VLIW) instruction.

5. The computer-implemented method of claim 1, wherein the set of processor instructions corresponds to an enumerated set of possible processor instructions for the processor.

6. The computer-implemented method of claim 1, wherein the set of processor instructions is generated randomly.

7. The computer-implemented method of claim 1, wherein the disassembler is used to validate a native code module.

8. A system for analyzing a disassembler, comprising:
an instruction generator, executing on a computing processor, generating a set of processor instructions; and
a disassembly validator, executing on the computing processor, validating the disassembler using each processor instruction from the set of processor instructions by:
obtaining an assembly representation for the processor instruction using the disassembler;
monitoring an execution of the processor instruction on a processor operating in single-step mode to produce an execution result for the processor instruction; and
determining a correctness of the disassembler by comparing the assembly representation for the processor instruction with the execution result for the processor instruction, the comparison comprising:
   verifying an instruction length of the processor instruction by:
     receiving a program counter from the execution result after execution of the corresponding processor instruction; and
     comparing a number of bytes advanced by the program counter with an instruction length predicted by the disassembler;
   verifying a branch target of the processor instruction by:
     receiving a value of a branch target from the execution result after execution of the corresponding processor instruction; and
     comparing the received branch target value with a branch target of the assembly representation for the processor instruction; and
   verifying memory access associated with the processor instruction by:
     using anonymous or copy-on-write memory during execution of the processor instruction; and
     receiving a hardware exception for an illegal memory access; and
   generating an error if an inconsistency is found between the assembly representation and the execution result, the error including a value of the processor instruction, the assembly representation of the processor instruction as determined by the disassembler, and/or state information associated with the error.

9. The system of claim 8, wherein the memory access is associated with segmented memory.

10. The system of claim 8, wherein determining the correctness of the disassembler involves:
   generating an error based on an inconsistency between the assembly representation and the execution result.

11. The system of claim 8, wherein the processor instruction corresponds to a very long instruction word (VLIW) instruction.

12. The system of claim 8, wherein the set of processor instructions corresponds to an enumerated set of possible processor instructions for the processor.

13. The system of claim 8, wherein the set of processor instructions is generated randomly.

14. The system of claim 8, wherein the disassembler is used to validate a native code module.

15. A non-transitory computer-readable storage medium storing instructions that when executed by a computer cause the computer to perform a method for analyzing a disassembler, the method comprising:
generating a set of processor instructions; and
validating the disassembler using each processor instruction from the set of processor instructions by:
obtaining an assembly representation for the processor instruction using the disassembler;
monitoring an execution of the processor instruction on a processor operating in single-step mode to produce an execution result for the processor instruction; and
determining a correctness of the disassembler by comparing the assembly representation for the processor instruction with the execution result for the processor instruction, the comparison comprising:
   verifying an instruction length of the processor instruction by:
     receiving a program counter from the execution result after execution of the corresponding processor instruction; and
     comparing a number of bytes advanced by the program counter with an instruction length predicted by the disassembler;
   verifying a branch target of the processor instruction by:
     receiving a value of a branch target from the execution result after execution of the corresponding processor instruction; and
     comparing the received branch target value with a branch target of the assembly representation for the processor instruction; and verifying memory access associated with the processor instruction by:
  using anonymous or copy-on-write memory during execution of the processor instruction; and
  receiving a hardware exception for an illegal memory access; and
generating an error if an inconsistency is found between the assembly representation and the execution result, the error including a value of the processor instruction, the assembly representation of the processor instruction as determined by the disassembler, and/or state information associated with the error.

16. The non-transitory computer-readable storage medium of claim 15, wherein the memory access is associated with segmented memory.

17. The non-transitory computer-readable storage medium of claim 15, wherein determining the correctness of the disassembler involves:
  generating an error based on an inconsistency between the assembly representation and the execution result.

18. The non-transitory computer-readable storage medium of claim 15, wherein the processor instruction corresponds to a very long instruction word (VLIW) instruction.

19. The non-transitory computer-readable storage medium of claim 15, wherein the set of processor instructions corresponds to an enumerated set of possible processor instructions for the processor.

20. The non-transitory computer-readable storage medium of claim 15, wherein the set of processor instructions is generated randomly.

21. The non-transitory computer-readable storage medium of claim 15, wherein the disassembler is used to validate a native code module.

* * * * *